(12) United States Patent
Sidarta et al.

(10) Patent No.: US 11,614,075 B2
(45) Date of Patent: Mar. 28, 2023

(54) METHOD OF MONITORING AND ADVISING FOR A GROUP OF OFFSHORE FLOATING WIND PLATFORMS

(71) Applicant: TECHNIP FRANCE, Nanterre (FR)

(72) Inventors: Djoni Eka Sidarta, Houston, TX (US); Nicolas Tcherniguin, Paris (FR)

(73) Assignee: TECHNIP ENERGIES FRANCE, Nanterre (FR)

( * ) Notice: Subject to any disclaimer, the term of this patent is extended or adjusted under 35 U.S.C. 154(b) by 71 days.

(21) Appl. No.: 17/397,029

(22) Filed: Aug. 9, 2021

(65) Prior Publication Data
US 2023/0039329 A1    Feb. 9, 2023

(51) Int. Cl.
*F03D 13/25*    (2016.01)
*B63B 21/50*    (2006.01)
*B63B 35/44*    (2006.01)

(52) U.S. Cl.
CPC ............ *F03D 13/25* (2016.05); *B63B 21/507* (2013.01); *B63B 35/44* (2013.01); *F05B 2240/93* (2013.01); *F05B 2240/95* (2013.01); *F05B 2240/96* (2013.01)

(58) Field of Classification Search
CPC ....... F03D 13/25; B63B 21/507; B63B 35/44; F05B 2240/93; F05B 2240/95; F05B 2240/96
See application file for complete search history.

(56) References Cited

U.S. PATENT DOCUMENTS

2015/0198950 A1* 7/2015 Kallaway ................ B63B 27/34
  701/21
2017/0287314 A1* 10/2017 Chua ...................... G08B 25/10

\* cited by examiner

*Primary Examiner* — Joseph Ortega
(74) *Attorney, Agent, or Firm* — Jackson Walker, LLP

(57) ABSTRACT

The disclosure provides a method and system to monitor and advise the status of a group of floating platforms, such as offshore floating wind platforms, by using a floating platform's motion in the group and detect one or more anomalies to identify one or more disorders (including irregularities) in the group. Input for this method can include information of wind speed and direction and orientations of the wind turbine nacelles. The orientation of the platform can complement the orientation of a wind turbine nacelle on the platform in case the platform is equipped with a turret. Disorders include, but not limited to, mooring line failure, shifts of a drag anchor, other issues with the mooring system components such as fairleads, issues with the ballasting configuration of the floater, issues with the turret (if any), issues with the swivel of the nacelle, issues with the rotor, and issues with the blades.

17 Claims, 6 Drawing Sheets

METHOD OF MONITORING AND ADVISING FOR A GROUP OF OFFSHORE FLOATING WIND PLATFORMS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to groups of floating platforms. Specifically, the disclosure relates to monitoring and advising on the condition of a group of floating platforms, based on an assessment of the group to detect disorders.

Description of the Related Art

Detection of mooring line failure is mainly done by the individual monitoring of the tension in the line. Technologies that have been developed to look at vessel positions for a given environment condition and direction. The known position of the vessel is compared to a predicted position by a numerical model for the same environment condition and direction. The position of the vessel will be quite different for an intact line condition compared to one with a broken line. This method requires monitoring the position of the vessel and environment condition. The measured positions and environment conditions must be fully synchronized for the method for accuracy, and if not, the area that the vessel can reach in a harsh environment can overlap with an area that can be reached in a mild environment with a broken mooring line.

A recently filed application uses the periods of the vessel at given vessel positions to determine mooring line failure. The intact line condition and a broken line will have different stiffness of the system, and therefore, different periods of the vessel. This approach requires only monitoring the position of the vessel and does not require monitoring the environment condition and the individual monitoring of the mooring line tension.

A recently filed application uses the hull's yaw angles together with the hull's roll and/or pitch angles at given hull positions to determine mooring line failure. In the case of most floating platforms, the hull's yaw, roll and pitch angles are the vessel's yaw, roll, and pitch angles. In the case of a turret-moored FPSO, the hull's yaw, roll and pitch angles are the turret body's yaw, roll and pitch angles. The hull's yaw angles will be quite different for intact line condition from the one of a broken line.

There remains a need to provide a predictable monitoring and advising method for a group of platforms to identify one or more non-conforming platforms.

BRIEF SUMMARY OF THE INVENTION

The disclosure provides a method and system to monitor and advise the status of a group of offshore floating platforms, such as a group of offshore floating wind platforms, by using a floating platform's position in the group and detect one or more anomalies that can be used to identify one or more disorders (including irregularities) in the group. The monitoring can use platform motions that can include translational motions or rotational motions of the platforms and components coupled to the platforms, such as wind turbines and wind turbine nacelles. Using multi-source data can improve the detection of anomalies of the offshore floating platforms and identification of the types of disorders. Input for this method can include information of environmental conditions such as wind speed and direction, such as from estimates or instruments such as anemometers, and orientations of the wind turbine nacelles, and water current speed and direction. The orientation of the platform can complement the orientation of the wind turbine nacelle of the wind turbine on the platform in case the platform is equipped with a turret. Disorders include, but not limited to, mooring line failure, shifts of a drag anchor, other issues with the mooring system components such as fairleads, issues with the ballasting configuration of the floater, issues with the turret (if any), issues with the swivel of the nacelle, issues with the rotor, and issues with the blades.

The disclosure provides a method for monitoring and advising for a group of selected floating platforms, comprising: a. selecting a time window for the group of selected floating platforms to determine an existence of one or more anomalies in the group; b. determining at least one value of at least one variable of a platform motion for the selected floating platforms for the selected time window; c. comparing the at least one value of the at least one variable of the platform motion of one of the floating platforms of the selected floating platforms to the at least one value of the at least one variable of the platform motion of other selected floating platforms to determine if the at least one value for the one platform is within a determined variance of the at least one value for the other selected floating platforms; d. repeating step (c) for other selected floating platforms in the group; and e. identifying any selected floating platforms with values outside the determined variance as outlier platforms.

The disclosure also provides a method for monitoring and advising for a group of selected floating platforms, comprising: a. selecting a time window for the selected floating platforms to determine an existence of one or more anomalies in the group; b. computing at least one value of at least one variable of a platform motion for the selected floating platforms for the selected time window; c. providing a value of at least one environmental condition of the selected floating platforms; d. arranging the selected floating platforms into a relative order to establish relative positions based on the value of the at least one environmental condition; e. comparing the at least one value of the at least one variable of the platform motion of one of the selected floating platforms to the at least one value of the at least one variable of the platform motion of other selected floating platforms in respect to the relative positions based on the value of the at least one environmental condition to determine if the at least one value for the one platform is within a determined variance of the at least one value for the other selected floating platforms; f. repeating step (e) for other selected floating platforms in the group; and g. identifying any selected floating platforms with values outside the determined variance as outlier platforms.

The disclosure further provides a system for monitoring and advising for a group of selected floating wind platforms having known positions at a baseline condition, the system comprising a data processing system configured to: a. select a time window for the group of selected floating platforms to determine an existence of one or more anomalies in the group; b. compute at least one value of at least one variable of a platform motion for the selected floating platforms for the selected time window; c. compare the at least one value of the at least one variable of the platform motion of one of the selected floating platforms to the at least one value of the at least one variable of the platform motion of other selected floating platforms to determine if the at least one value for the one platform is within a determined variance of the at least one value for the other selected floating platforms; d. repeat step (c) for other selected floating platforms in the group; and e. identify any selected floating platforms with values outside the determined variance as outlier platforms.

DETAILED DESCRIPTION

Figure 1:
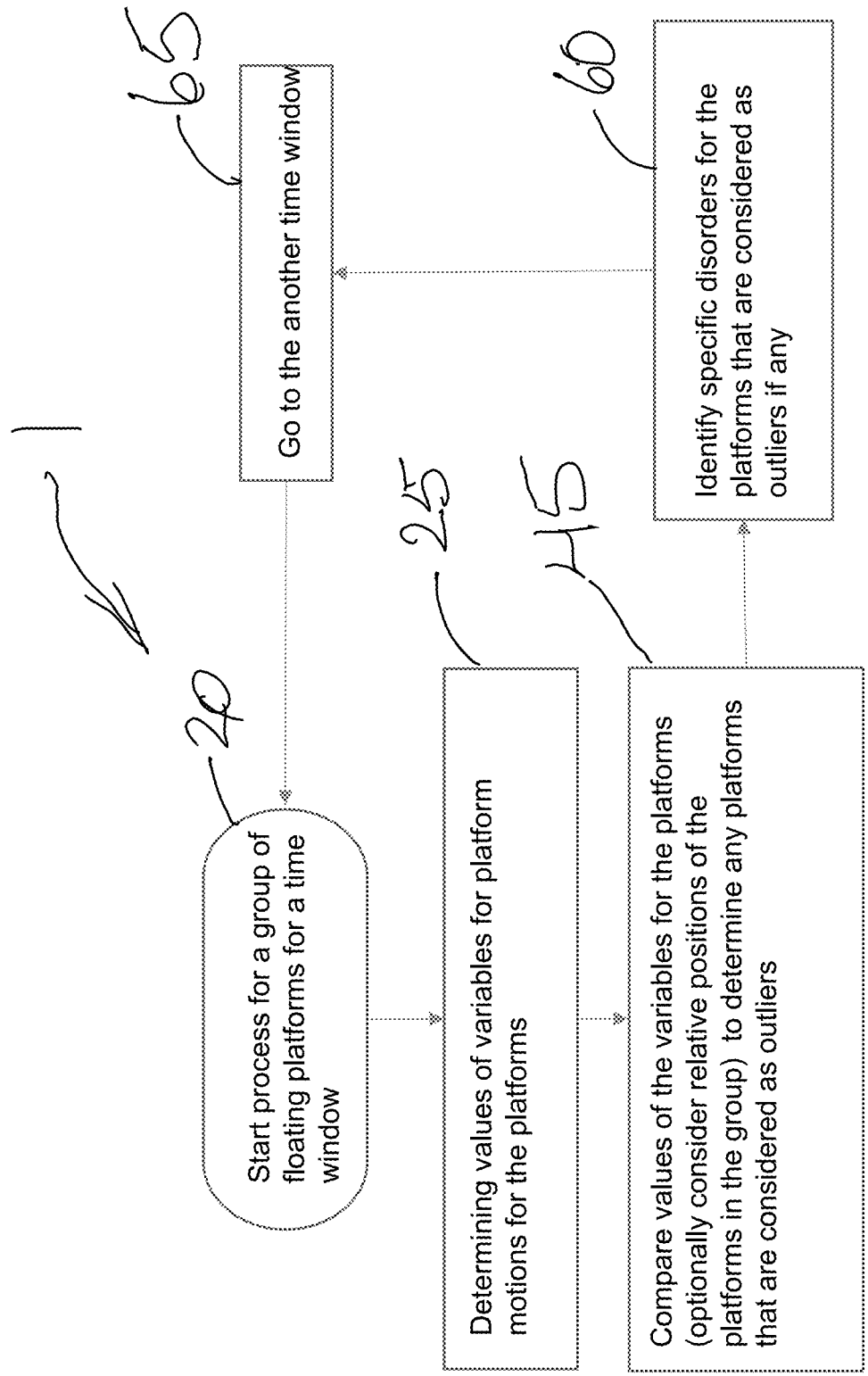
FIG. 1 is a schematic of an illustrative flow chart of an embodiment of the invention for detecting disorders.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, or numbers with prime, double prime, and so forth, such as 1, 1', 1", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments are disclosed that use various element numbers for like elements.

The disclosure provides a method and system to monitor and advise the status of a group of floating platforms, such as a group of offshore floating wind platforms, by using a floating platform's position in the group and detect one or more anomalies that can be used to identify one or more disorders (including irregularities) in the group. The monitoring can use platform motions that can include translational motions or rotational motions of the platforms and components coupled to the platforms, such as wind turbines and wind turbine nacelles. Platform motions are defined herein to include variables such as surge, sway, heave, yaw, roll, and pitch; orientation of a wind turbine nacelle coupled to the platform; structural responses and sound characteristics from movement of the platform or components, including frequencies and intensities; power output of the wind turbine; and rotor performance of the wind turbine; and other variables of platform motions. Using multi-source data can improve the detection of anomalies of the offshore floating wind platforms and identification of the types of disorders. Input for this method can include information of environmental conditions such as wind speed and direction, such as from estimates or instruments such as anemometers anemometers, and orientations of the wind turbine nacelles, and water current speed and direction. The orientation of the platform can complement the orientation of the wind turbine nacelle of the wind turbine on the platform in case the platform is equipped with a turret. Disorders (defined to include irregularities) for example can be, but are not limited to, mooring line failure, shifts of a drag anchor, other issues with the mooring system components such as fairleads, issues with the ballasting configuration of the floater, issues with the turret (if any), issues with the swivel of the nacelle, issues with the rotor, and issues with the blades.

A combination of an expert system and an iterative approach can be used to implement the detecting system described herein. Detection of anomalies can utilize Artificial Intelligence (AI), such as, but not limited to, Artificial Neural Networks (ANN) for pattern recognition and classification, expert system and fuzzy logic, and/or other numerical algorithms. Machine learning or ANN can be trained with examples of normal patterns and anomaly patterns for the model to recognize, classify, and identify specific patterns. These training patterns can be generated using simulations and can be combined with measured data. The patterns are presented as ANN inputs, and they can be in the form of the statistics of platform motions. The ANN outputs can give identification of the specific patterns and provide an estimated accuracy factor. A set of rules can be constructed to define normal patterns and anomaly patterns with associated disorders. Different types of anomalies can be included. The rules and criteria to define the normal patterns and anomaly patterns can be formed as a function of the statistical values of platform motions. This set of rules defines the knowledge-based system and can be used as the backbone for developing an expert system. A fuzzy logic can be used to interpret the results of various models and algorithms to improve the confidence level of the monitoring system's prediction. An iterative approach can be used to evaluate values, including trends of the statistical values of the platform's motions in multiple platforms. Each iteration can try to identify the platforms that are considered as outlier platforms, and the iterations can stop when convergence has been achieved of the identified platforms that are considered as outlier platforms occurs within a defined acceptable variance. The determination of the platforms that are considered as outlier platforms in each iteration can be based on evaluation of the values of the measured variables of interests, such as the statistical values of platform motions.

The method can have one or more of the following advantages:

One or more platform motions can be derived from its positions monitored by Global Positioning System (GPS) or other location determining technology Post-processing techniques of the monitored data to get the required variables are standard practice.

This approach does not require monitoring the environment conditions and can use estimates.

The computer programs for the monitoring system can be run on a standard computer.

The program can run in the cloud remotely from the platform with data sent to the cloud.

Identification of disorders can be done close to real time.

Monitoring tools can be in a protected area that is generally not subject to seawater or seawater spray.

Figure 3:
FIG. 3 is a schematic plan view of a group of floating platforms subject to wind variations and anomalies.

FIG. 1 is a schematic of an illustrative flow chart of an embodiment of the invention for detecting disorders. FIG. 3 is a schematic plan view of a group of floating platforms subject to wind variations and anomalies. Advantageously, the group 2 of floating platforms have similar response characteristics to environmental condition variables, such as wind direction and speed, and waves and current flow. For illustration, wind platforms and components such as nacelles will be described herein, with the understanding that the principles can apply to other types of groups of floating platforms. In general, an iterative approach in combination with an expert system can be used to implement a process and accompanying system for detecting anomalies and identifying disorders in a group of floating platforms.

Referring to FIGS. 1 and 3, the process 1 can start with identifying a group of floating platforms 2, such as a group of offshore floating wind platforms known as a wind farm. Other examples of groups of floating platforms can be hydrocarbon floating platforms and FPSOs. For illustration herein, the examples of a group of offshore floating wind platforms will be described and where applicable certain features, such as wind turbine nacelles, will be referenced with the understanding the similar steps can be performed in other types of groups of floating platforms that may be particularized for the attributes of each group.

The group of floating platforms can have one or more leading platforms 8 that are upstream of other platforms at a given time. Each floating platform can have one or more types of platform motion. Some platform motions can be affected by environmental conditions such as an average wind direction 24 relative to a datum 38, such as compass north N or others. First stage downstream platforms 10 are downstream of the leading platforms 8, second stage downstream platforms 14 are downstream of the first stage downstream platforms 10, third stage downstream platforms 16 are downstream of the second stage downstream platforms 14, and fourth stage downstream platforms 22 are downstream of the third stage downstream platforms 16, and so forth. The platforms can each have an initial position 32, which may form a baseline from which other measurements can be made. The platforms can have their respective motions, such as being offset to an expected position 34 having an orientation 4 at a distance 6 from the initial position 32. If one or more of the platforms is outside a range of expectation by an orientation 4' or distance 6' or both, the platform can be identified as an outlier platform 18 at an outlier position 36, as explained in further detail herein.

In at least one embodiment, the steps generally can include:

starting the process for a group of selected platforms for a selected time window;

determining (by providing and/or computing) at least one value of one or more variables of platform motions for the selected platforms for the selected time window;

comparing one or more values of variables for the platforms to determine one or more platforms that are considered as outlier platforms, and optionally considering in the comparison relative upstream and/or downstream positions of the platforms that can factor one or more environmental conditions;

optionally, identifying specific disorder(s) for the platforms that are considered as outlier platforms, if any, using the values of the variables; and optionally, repeating the process for another time window.

At step 20, a time window to associate with variables of the platforms' motions and potentially other parameters is selected on which to perform the analysis described herein. The time window may be past time, real time, or a delayed time and can be a period of time or in some embodiments an instant of time.

At step 25, for that group of platforms at that time, values can be determined for one or more variables related to platform motions for the group of selected platforms. Generally, it is expected that some of the values will include values for variables related to position of the platforms and components coupled thereto in the x- and y-axes, and in some embodiments the z-axis, shown in FIGS. 4B-4C. Values can be termed "direct values" herein that are produced directly from the available estimated or measured data. The direct values can be analyzed using statistical calculations to further evaluate the platform motions to produce statistical values. One or more values can exist for each determined variable at a given time. For example, an offset direction 4 for a platform motion shown in FIG. 3 can be established as a direct value for each selected platform, relative to a fixed datum 38, such as a compass direction N, or a datum that can be applicable during the given time window in step 20, such as an average wind direction 24. A statistical value of the offsets, such as a group average offset 26, can be established as a result of the direct values of the individual platforms. Further, remote monitoring, such as gained through image recognition at different times can show different positions of platforms, nacelles, and other structures that changed through intervening platform motions. Statistical values for the platform motions may include, but not limited to, mean, median, and mode averages, standard deviations, RMS, periods (low-frequency periods, zero-crossing periods), and other statistical permutations, including trends of such variables.

In step 45, the values of a variable for each of the selected platforms can be compared to the values of the variable for the other selected platforms, individually or as a group, optionally considering relative positions of the platforms in the group. Platform(s) having a comparison of its value (direct value or statistical value) that is outside of an acceptable variance can be identified as an outlier platform 18. For example, an outlier platform can have a different offset direction 4', different offset distance 6', different nacelle orientation (not shown), and/or other anomalies compared to other platforms in the group of platforms that can indicate disorders compared to the other platforms. This evaluation can also employ an artificial intelligence (AI)-based evaluation, such as fuzzy logic. Monitoring or assessment of any anomalies of each variable among the platforms can be done in approximately real time, and the assessments can be available in approximately real time as well.

In step 60, once any platforms have been determined as outlier platforms, the process can then be used to help identify specific disorders, depending on the applicable variables, including trends of those variables, which caused the identification of the outlier platforms. In some determinations, individual variables can be used and in other determinations, known combinations of variables can be used to indicate one or more identifiable disorders. The identification can also be based on a comparison to a library of anomaly signatures with associated disorders. The library of anomaly signatures can be generated prior to the deployment of the platforms using simulation that encompasses potential disorders, and this library can be updated with actual behavior and responses of the particular platform or a group of platforms. A set of rules and criteria can be used to detect, recognize, and identify the type of anomaly with one or more associated disorders based on the constructed library of anomaly signatures. The process can indicate the potential disorder that has been identified, and can include a reliability index, such as a percentage, as to the accuracy of the identified disorder(s).

In step 65, the process can be considered completed for the selected time window in the evaluation. A further evaluation of the group of floating platforms at a selected next time window can begin by returning to step 20.

Figure 2:
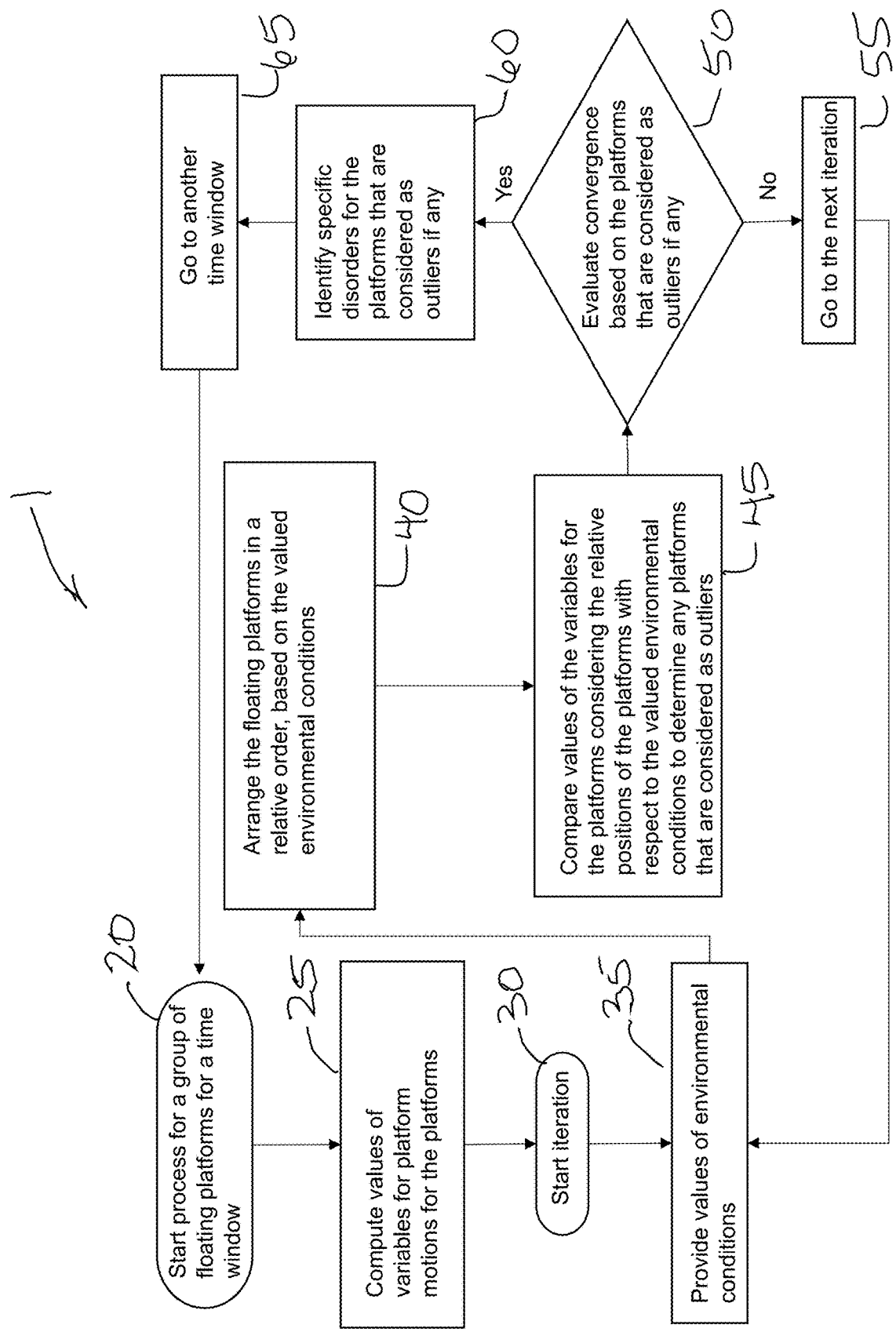
FIG. 2 is a schematic of an illustrative flow chart of a more specific embodiment of the invention for detecting anomalies.

FIG. 2 is a schematic of an illustrative flow chart of a more specific embodiment of the invention for detecting anomalies. The flow chart uses aspects from the flow chart in FIG. 1 and provides variations, further details, and/or additional steps. For example, steps 20 and 25 in FIG. 2 are at least similar to steps 20 and 25 that have been explained regarding FIG. 1.

At step 30, an iterative sequence starts that can include estimates and convergence of the data.

At step 35, one or more values for one or more environmental conditions, such as wind direction, wind speed, water current direction and/or water current speed, can be provided by estimates or actual values obtained through instrument data or other measurements. An environmental condition that has been provided a value, estimated or from measured data, is considered herein as a valued environmental condition. A valued environmental condition can be used as a basis for arranging an order of the platforms, comparisons and convergence of the data, and other uses. For example, an estimated wind direction 24 (average or other statistic) can be a valued environmental condition as an estimated average wind direction for the group of platforms 2. Wind speed could also be estimated as another environmental condition that has been valued. Directions 4 and distance 6 of the selected platforms' offsets can be measured from the positions of the platforms via GPS or other means. In some systems, remotely accessible information on speed and direction of wind can be obtained from instruments, such as anemometers on wind turbine nacelles 12 (shown in FIGS. 4B-4C). In regions with significant water currents, the water current environmental condition such as direction and/or speed may be estimated, although if measurements are also available, those measurements may be used. Remotely accessible information on orientations of the wind turbine nacelles 12 can also be obtained. In at least one embodiment, directions of the platforms' offsets, information of speed and direction of wind, and/or orientations of the wind turbine nacelles can be used to estimate the one or more environmental conditions affecting the platforms, and in some embodiments, the distances of the platforms from their initial positions can be used to estimate the speeds.

In step 40, the platforms in the group can be arranged in a relative order, such as an upstream and downstream sequence, based on the one or more values (estimated or measured) of the one or more valued environmental conditions, such as direction. The relative order can be from the leading platform to the most downstream platform. In at least one embodiment, arranging the relative order can be helpful because theoretical or empirically determined positions and orientations of platforms or components are affected by the order of the platform relative to other platforms in the group. Variables, such as wake effects, turbulence, progressive reduction of energy, and other variables, affect the flow stream of wind and current that pass through and interact with other floating platforms in the group and therefore affects one or more of the platforms' motions. The sequence of the platforms can be arranged in a relative order based on criteria, such as a distance and direction of a specific platform position for the environmental condition(s) at the particular time window selected for the analysis compared to a position of the platform at one or more baseline environmental conditions. Other criteria are possible.

Figure 4A:
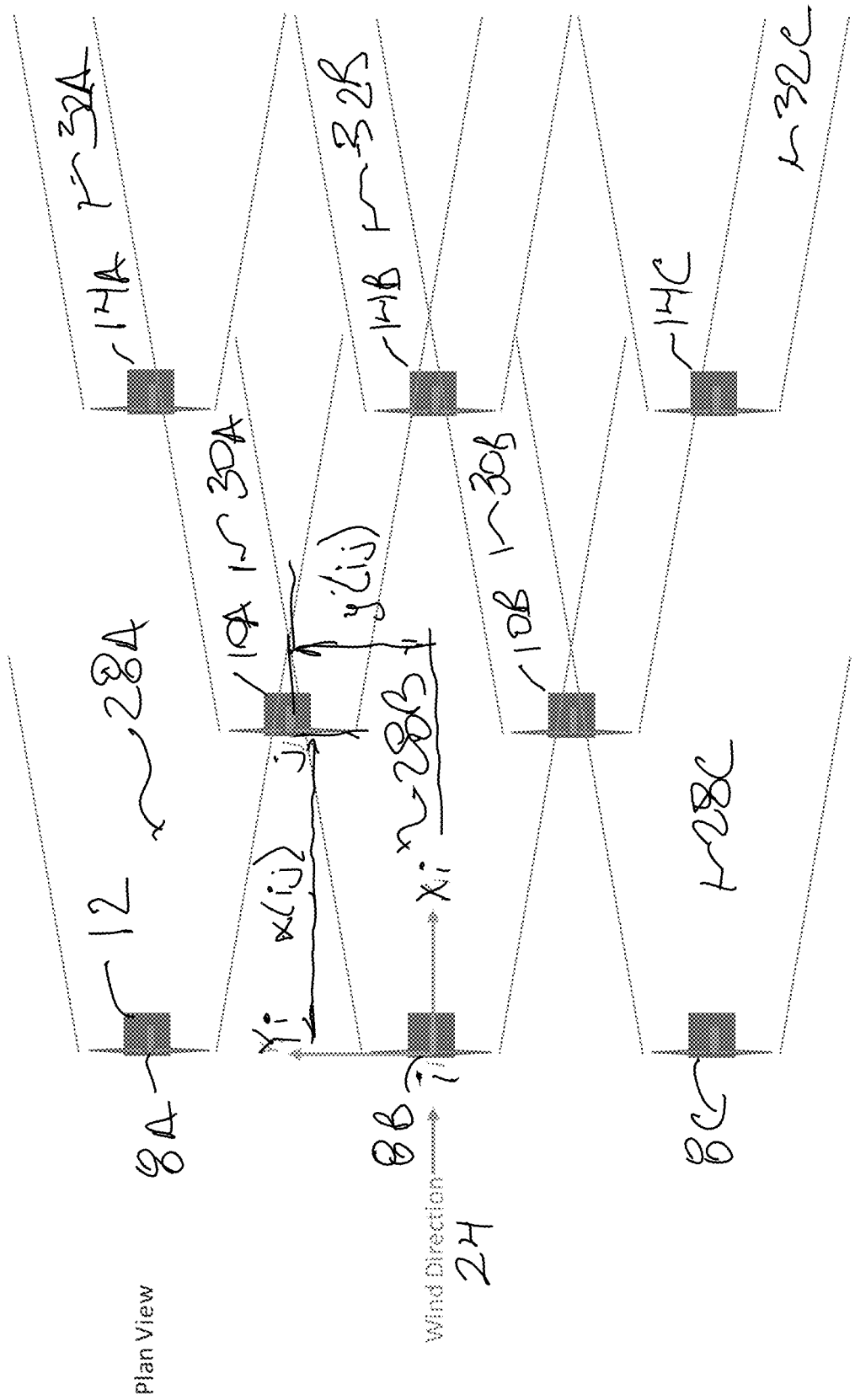
FIG. 4A is a schematic plan view of an example of a group of floating platforms.
Figure 4B:
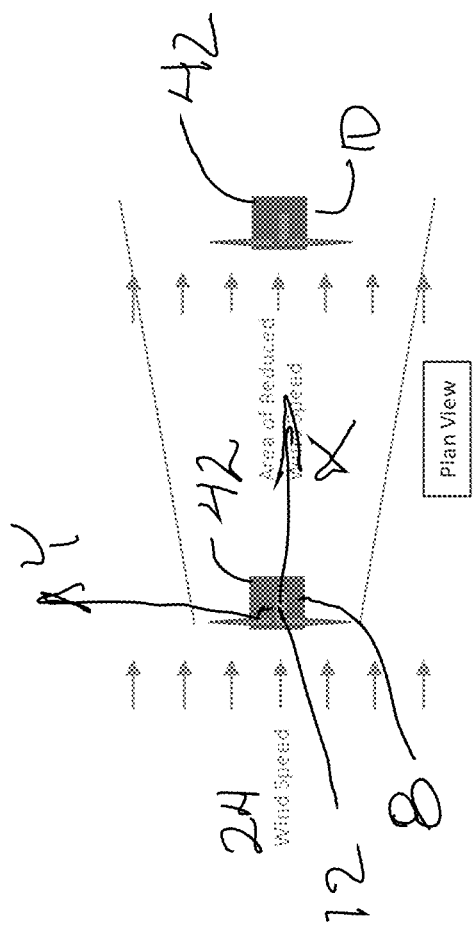
FIG. 4B is a schematic plan view of an example of a leading platform and a downstream platform with an illustrated horizontal wind reduction.
Figure 4C:
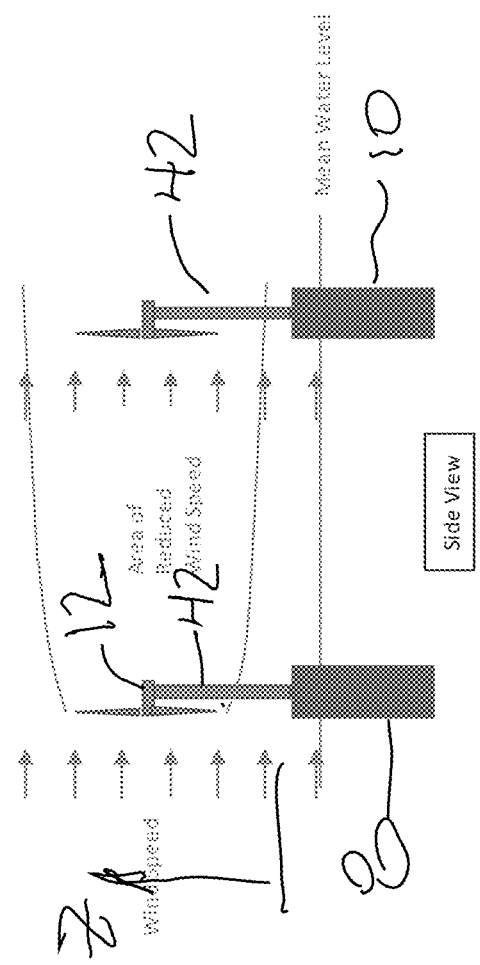
FIG. 4C is a schematic side view of an example of a leading platform and a downstream platform with an illustrated vertical wind reduction.

FIG. 4A is a schematic plan view of an example of a group of floating platforms. FIG. 4B is a schematic plan view of an example of a leading platform and a downstream platform with an illustrated horizontal wind reduction. FIG. 4C is a schematic side view of an example of a leading platform and a downstream platform with an illustrated vertical wind reduction. To illustrate the above-described impacts on downstream platforms that can change the performance and position of the downstream platforms, FIGS. 4A-4C represent wakes for wind from the platforms that affect downstream platforms relative to their positions with similar concepts applying for water current. The leading platforms 8A, 8B, and 8C (generally 8) generally have no upstream wake to affect them. The nacelles 12 can align with the wind direction and have maximum wind thrust under normal operating conditions unimpeded by other platforms. However, the leading platforms 8 generate a downstream wake 28A-28C (generally 28). A set of first stage downstream platforms 10A and 10B (generally 10) incurs the wake 28 of the leading platforms 8 as the second line of platforms. The wake 28 generally reduces wind speed to the downstream platforms 10 and can change the wind direction caused by interference from the wake 28 from the leading platforms 8. Depending on the relative location, the first stage downstream platforms 10 may incur wake from more than one leading platform, such as wakes 28A and 28B from leading platforms 8A and 8B, respectively, which overlap on the first stage downstream platform 10A. Similarly, the second stage downstream platforms 14 receive effects from the wakes 30A-30B (generally 30) from the first stage downstream platforms 10 and the residual effects of the wakes 28 of the leading platforms 8 after passing the platforms 10. Any platforms downstream of the platforms 14 incur effects of the wakes 32A-32C (generally 32) of the platforms 14 and the residual effects of the upstream wakes 28 and 30.

More specifically in at least one embodiment, the ordering can be accomplished in the following illustrative steps referring to FIGS. 4A-4C, with the understanding that other ordering methods are available and other environmental condition(s) can be the basis of the ordering.

For each platform i in the group, determining the inline axis X, and transverse axis Y, orthogonal to the valued environmental condition(s), such as the wind direction 24, shown in FIG. 4A;

For each platform j that is downstream of platform i, computing the inline distance x(ij) and transverse distance yap between the platform i and the platform j and the wind direction for the platform i;

Computing a reduction factor of flow speed for each platform j due to platform i using existing wake models based on the inline distance x(ij) and transverse distance y(ij); and Computing the wind speed factor=1.0–reduction factor wherein the reduction factor is zero for platforms j that are not in the wake of platform i, so that the wind speed factor equals 1.0 with the understanding that other baseline numbers beside 1.0 could be used.

A wake is a region of disturbed flow when fluid passes a solid body. A reduction factor, as used herein, of flow speed with respect to a free-stream flow speed includes any of the factors of wake effect, speed deficit, and speed reduction factor that are known in the field. After completing the above steps for each of the selected platforms, the following steps can be performed:

Computing an aggregate wind speed factor for each of the selected platforms to account for the wake effect of each of the selected platforms;

Arranging the selected platforms in a relative order such as from the platform with the highest aggregate wind speed factor to the platform with the lowest aggregate wind speed factor; and In case of the same aggregate wind speed factor for two or more platforms, using other variables such as the inline distance $x_i^j$ and transverse distance $y_i^j$ to refine the order.

In step 45, one or more values of one or more variables of the platform motions for each selected platform can be compared to corresponding values of other platforms in the group or aggregate values of the group considering the relative positions of the platforms with respect to the valued environmental condition(s) to determine any platforms that are considered as outliers. The values can include direct values and/or statistical values, including trends in the variables, which can be computed using the direct values. While the values are generally numeric, nonnumeric values can be used to assess different variables and thus the values is not limited to numerals. Anomalies of the values of each variable among multiple platforms in the vicinity can indicate group disorders. Monitoring or assessing anomalies, if any, of one or more of the variables among multiple platforms in the vicinity can be done close to real time, and the assessments can be available close to real time as well. If the value of a variable of the selected platform is not within an acceptable variance of the values of the other platforms, then the selected platform is considered a potential outlier platform. The process can be repeated for each of the variable and each of the selected platforms.

In at least one embodiment, the direct values and/or statistic values of the variables of a platform's motions can be compared with the other platforms using an estimated value for one or more of the environmental conditions (including derivations of the environmental condition(s)) in step 35 and the wake effect, if any. Thus, the relative position of the platform in the order based on the estimated environmental condition(s) determined in step 40 can be considered in the comparison.

In another embodiment, the comparing in step 45 can include two secondary steps of comparing. One secondary step of comparing can include comparing measured values (direct values and/or statistical values) of one or more variables from step 25 of each of the selected platforms to corresponding values for such variables in the other selected platforms. The other secondary step can include comparing the measured values of one or more variables for each of the selected platforms to estimated values for such variables for such platform, where the estimated values can be based on one or more environmental conditions. The values of the one or more environmental conditions can be estimated values as well.

Step 50 can be used to determine if there is a convergence of the identification of outlier platforms by comparing results of values of multiple variables of platform motions among the selected platforms, including results based on environmental conditions (measured or estimated). If the value is a measured value, then convergence is likely as to that variable and the process can proceed to step 60 described below. If the value is an estimated value or derived from an estimate value such as an environmental condition, such as wind direction and/or speed, or water current direction and/or speed, then this step can be particularly useful. In such estimates, the lack of convergence may indicate that the estimated value for the environmental condition needs to be refined in another iteration that may change simulated values on the platform motions and therefore the amount of convergence that benefits from another iteration, discussed in step 55 below. For convergence analysis, the identified potential outlier platforms for each variable can be compared to the identified potential outlier platforms for other variables. If the same platforms are identified as outlier platforms for multiple variables within an acceptable variance, then this portion of the process is considered converged and the anomalies that identified these one or more platforms as outlier platforms most likely indicate actual disorders.

In step 55, if the same platforms are not identified in the multiple iterations within an acceptable variance (particularly if using an estimated value for a particular variable), then the process returns to the earlier step 35 for another iteration with different input for at least one of the variables, such as one or more environmental conditions, arranging an order to the platforms, comparing values, and so forth as described above until the identification of the outlier platforms converges within an acceptable variance.

In step 60, once any platforms that are considered as outlier platforms have been determined, the process then attempts to identify disorders depending on the applicable variables and values for those variables that caused the identification of the platform as an outlier platform. For example, an identification can be determined based on known or predicted combinations of variables that may indicate at least one specific disorder. As another example, a determination can be based on a comparison of the anomaly signature to a library of anomaly signatures of disorders. The library of anomaly signatures can be generated prior to the deployment of the platforms using simulation that encompass potential disorders. This library can be updated with actual behavior and responses of the particular platform or a group of platforms. A set of rules and criteria can be used to detect, recognize, and identify the type of disorder based on the constructed library of anomalies' signatures. The process can indicate potential disorder(s), and can include a reliability index, such as a percentage, as to the accuracy of the identified disorder(s).

In step 65, the process can be considered completed for the selected time window in the evaluation. A further evaluation of the group of floating platforms at another selected time window can begin by returning to step 20.

Figure 5:
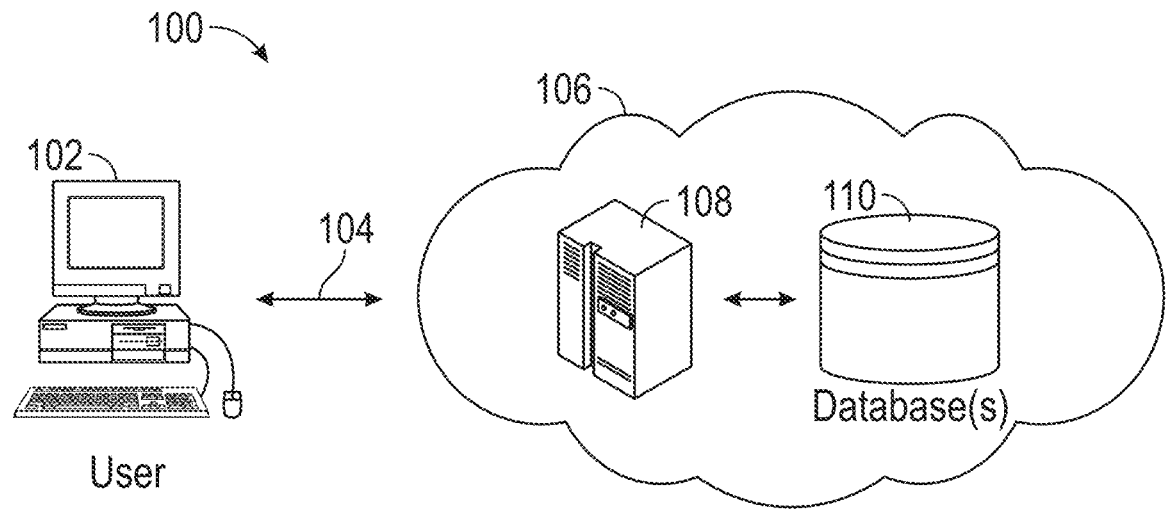
FIG. 5 illustrates an example of a computing system in which the steps for monitoring a group of floating platforms, such as offshore floating wind platforms, according to the disclosed embodiments to detect anomalies in the group.

FIG. 5 illustrates an example of a computing system in which the steps for monitoring a group of floating platforms, such as offshore floating wind platforms, according to the disclosed embodiments to detect anomalies in the platform group. As can be seen, the system can include at least one user processing device 102 that can be connected via a network connection 104 to a network 106. In the present example, the user-processing device 102 may be a desktop computer, notebook computer, tablet, smart phone, and other processing device, and the network connection 104 may be a wired and/or wireless network connection. Alternatively, the processing device 102 may be a stand-alone system that does not interface with a network or network servers. One or more network servers 108 may be connected to the network 106 with at least one database 110, which may be either an internal database that resides within the network servers 108, or a database that resides in a physically separate location from the network servers 108 (as shown here), depending on the constraints (e.g., size, speed, etc.) of the particular implementation. Note that the term "server" is used herein to include conventional servers, as well as high-end computers, workstations, mainframes, supercomputers, and the like. Similarly, the at least one database 110 may be a relational database, operational database, or other suitable database capable of storing data and information, including rules and criteria to define the normal patterns and anomaly patterns with potential associated disorders of the floating platforms and training examples for an expert system, pattern recognition, results of analysis, and other data as relevant to the processes described herein.

Figure 6:
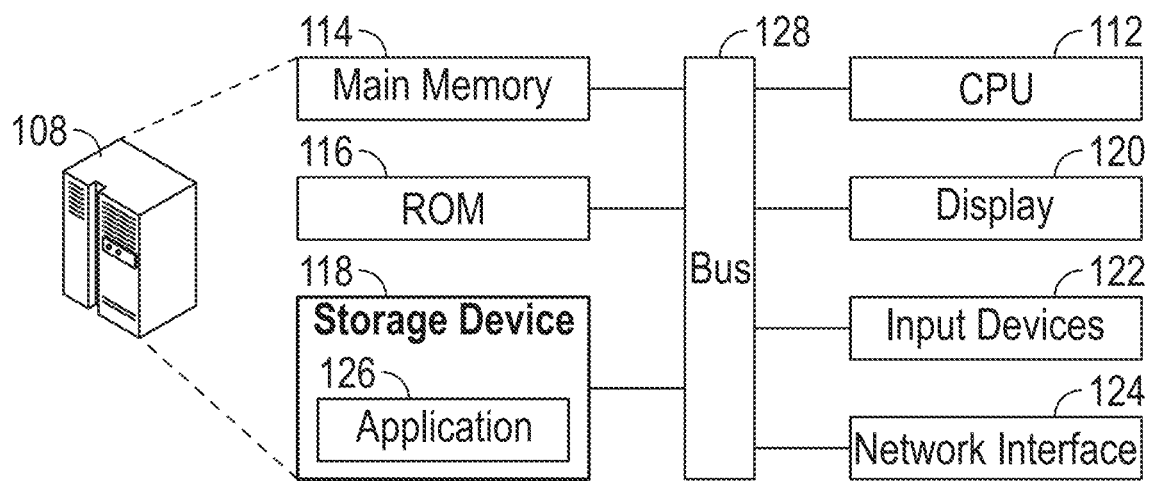
FIG. 6 illustrates an illustrative server that may be used as one of the one or more servers on the computing network.

FIG. 6 illustrates an illustrative server that may be used as one of the one or more servers 108 on the computing network 106. As mentioned earlier, this server 108 may be any suitable data processing system known to those having ordinary skill in the art, including a high-end server, workstation, mainframe, supercomputer, and the like. Such a server 108 typically includes a bus 128 or other communication mechanism for transferring information within the server 108, and a CPU 112 coupled with the bus 128 for processing the information. The server 108 may also include a main memory 114, such as a random access memory ("RAM") or other dynamic storage device coupled to the bus 128 for storing computer-readable instructions to be executed by the CPU 112. The main memory 114 may also be used for storing temporary variables or other intermediate information during execution of the instructions to be executed by the CPU 112. The server 108 may further include a read only memory ("ROM") 116 or other static storage device coupled to the bus 128 for storing static information and instructions for the CPU 112. A computer-readable storage device 118, such as a magnetic disk, optical disk, or solid-state memory device, may be coupled to the bus 128 for storing information and instructions for the CPU 112.

The term "computer-readable instructions" as used above refers to any instructions that may be performed by the CPU 112 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 118.

Volatile media may include dynamic memory, such as main memory 114. Transmission media may include coaxial cables, copper wire, and fiber optics, including wires of the bus 128. Transmission itself may take the form of acoustic or light waves, such as those generated during radio frequency ("RF") and infrared ("IR") data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 112 may also be coupled via the bus 128 to a display 120 for displaying information to a user. One or more input devices 122, including alphanumeric and other keyboards, mouse, trackball, cursor direction keys, and so forth, may be coupled to the bus 128 for communicating information and command selections to the CPU 112. A network interface 124 provides two-way data communication between the server 108 and other computers over the network 106. In one example, the network interface 124 may be an integrated services digital network ("ISDN") card or a modem used to provide a data communication connection to a corresponding type of telephone line. As another example, the network interface 124 may be a local area network ("LAN") card used to provide a data communication connection to a compatible LAN. Wireless links may also be implemented via the network interface 124. In summary, the main function of the network interface 124 is to send and receive electrical, electromagnetic, optical, or other signals that carry digital data streams representing various types of information.

In accordance with the disclosed embodiments, an application 126 for monitoring a group of floating platforms to detect anomalies in the platforms, or rather the computer-readable instructions therefor, may also reside on the storage device 118. The computer-readable instructions for the application 116 may then be executed by the CPU 112 and/or other components of the server 108 to detect the disorders in the platforms. Such an application 126 may be implemented using any suitable application development environment and programming language known to those having ordinary skill in the art to carry out the steps of the algorithms disclosed and described herein. As noted above, in various embodiments, the application 126 may be a stand-alone application that may be executed independent of other applications, or it may be in the form of a plugin module to an existing software package, and the like.

Other and further embodiments utilizing one or more aspects of the invention described above can be devised without departing from the spirit of Applicant's invention. For example, using simulation and actual data to train an artificial intelligence model, as discussed above, can be used to determine the actual wake effect and determine short/medium term production performance of a wind turbine or a group of wind turbines or other platforms. As other examples, other types of geographical position determining devices, various equipment such as alarms, software for remote sensing, dedicated software linked to the a control system, and the like can be used to enhance the operation and notification of the monitoring system, along with other variations can occur in keeping within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A method for monitoring and advising for a group of selected floating platforms, comprising:
    a. selecting a time window for the group of selected floating platforms to determine an existence of one or more anomalies in the group;
    b. determining at least one value of at least one variable of a platform motion for the selected floating platforms for the selected time window;
    c. comparing the at least one value of the at least one variable of the platform motion of one of the floating platforms of the selected floating platforms to the at least one value of the at least one variable of the platform motion of other selected floating platforms to determine if the at least one value for the one platform is within a determined variance of the at least one value for the other selected floating platforms;
    d. repeating step (c) for other selected floating platforms in the group; and
    e. identifying any selected floating platforms with values outside the determined variance as outlier platforms.

2. The method of claim 1, further comprising identifying at least one of specific disorders in at least one of the outlier platforms compared to other platforms in the group.

3. The method of claim 1, further comprising considering relative locational positions of the selected floating platforms in determining any selected floating platforms as outlier platforms.

4. The method of claim 1, further comprising repeating step 1(b) for other variables of platform motion.

5. The method of claim 1, wherein the at least one value of the at least one variable of the platform motion comprises at least one of a direct value or a statistical value of the direct value.

6. The method of claim 1, wherein the at least one value of the at least one variable of the platform motion of other selected floating platforms comprises a statistical composite of the values for each of the other selected floating platforms.

7. A method for monitoring and advising for a group of selected floating platforms, comprising:
    a. selecting a time window for the selected floating platforms to determine an existence of one or more anomalies in the group;
    b. computing at least one value of at least one variable of a platform motion for the selected floating platforms for the selected time window;
    c. providing a value of at least one environmental condition of the selected floating platforms;
    d. arranging the selected floating platforms into a relative order to establish relative positions based on the value of the at least one environmental condition;
    e. comparing the at least one value of the at least one variable of the platform motion of one of the selected floating platforms to the at least one value of the at least one variable of the platform motion of other selected floating platforms in respect to the relative positions based on the value of the at least one environmental condition to determine if the at least one value for the one platform is within a determined variance of the at least one value for the other selected floating platforms;

f. repeating step (e) for other selected floating platforms in the group; and g. identifying any selected floating platforms with values outside the determined variance as outlier platforms.

8. The method of claim 7, wherein step (e) further comprises comparing measured values for one or more variables for each of the selected platforms to estimated values for such variables for such platform, where the estimated values are based on one or more environmental conditions.

9. The method of claim 7, wherein the value of the at least one environmental condition is an estimated value.

10. The method of claim 7, further comprising:

h. evaluating a convergence in the step (g) by comparing results of values of multiple variables.

11. The method of claim 10, further comprising:

i. repeating steps (c)-(h) if the convergence is not within a predetermined acceptable variance with a different value for at least variable.

12. The method of claim 7, further comprising j. identifying at least one of specific disorders in at least one of the outlier platforms compared to other platforms in the group.

13. The method of claim 7, wherein arranging the selected floating platforms into the relative order in step (d), comprises:

d.1. determining an inline axis and transverse axis orthogonal to the environmental condition in step (a) for an initial selected floating platform i;

d.2. computing an inline distance and transverse distance between a selected floating platform i and a platform j downstream of the selected floating platform i and a wind direction for the selected floating platform j;

d.3. computing at least one reduction factor of flow speed for the selected floating platform j due to selected floating platform i based on the inline distance and transverse distance;

d.4. computing a wind speed factor by subtracting the reduction factor from 1.0, wherein the reduction factor is zero for platforms j that are not in the wake of platform i, and the wind speed factor is 1.0;

d.5. repeating steps (d.2)-(d.4) for each platform j d.6. repeating steps (d.1)-(d.5) for each selected platform i.

d.7. computing a wind speed factor for each of the selected platforms; and d.8. ordering the selected platforms into a sequence based on the wind speed factor to create the relative order of the platforms.

14. A system for monitoring and advising for a group of selected floating wind platforms having known positions at a baseline condition, the system comprising a data processing system configured to:

a. select a time window for the group of selected floating platforms to determine an existence of one or more anomalies in the group;

b. compute at least one value of at least one variable of a platform motion for the selected floating platforms for the selected time window;

c. compare the at least one value of the at least one variable of the platform motion of one of the selected floating platforms to the at least one value of the at least one variable of the platform motion of other selected floating platforms to determine if the at least one value for the one platform is within a determined variance of the at least one value for the other selected floating platforms;

d. repeat step (c) for other selected floating platforms in the group; and e. identify any selected floating platforms with values outside the determined variance as outlier platforms.

15. The system of claim 14, wherein the data processing system is further configured to consider relative locational positions of the platforms in determining any platforms as outlier platforms.

16. The method of claim 14, wherein the data processing system is further configured to repeat step (b) for other variables of platform motion.

17. The method of claim 14, wherein the data processing system is further configured to identify at least one of specific disorders in at least one of the outlier platforms compared to other platforms in the group.

* * * * *